United States Patent [19]

Taylor

[11] Patent Number: 4,930,221

[45] Date of Patent: Jun. 5, 1990

[54] UNIVERSAL PRECISION MEASURING GAUGE

[76] Inventor: Christopher L. Taylor, 3615 Courtdale Dr., Farmers Branch, Tex. 75234

[21] Appl. No.: 288,417

[22] Filed: Dec. 21, 1988

Related U.S. Application Data

[63] Continuation-in-part of Ser. No. 117,954, Nov. 9, 1987, Pat. No. 4,793,604.

[51] Int. Cl.⁵ .................... G01B 5/14; B43L 13/02
[52] U.S. Cl. ................................. 33/811; 33/42; 33/197; 33/640
[58] Field of Search ............... 33/42, 197, 464, 626, 33/640, 641, 630, 670, 809, 810, 811, 812, 806, 783, 567.1, 501.06, 501.08

[56] References Cited

U.S. PATENT DOCUMENTS

| 2,205,979 | 6/1940 | Horechney | 33/811 X |
| 2,319,436 | 5/1943 | Bailie | 716/240 X |
| 3,124,180 | 3/1964 | Catz | 143/169 |
| 4,793,604 | 12/1988 | Taylor | 269/303 |
| 4,805,889 | 2/1989 | Liepse | 269/902 |

FOREIGN PATENT DOCUMENTS 109796 2/1940 Australia ........................... 33/559

586485 10/1933 Fed. Rep. of Germany ........ 33/648

Primary Examiner—Harry N. Haroian
Attorney, Agent, or Firm—Dennis T. Griggs

[57] ABSTRACT

A precision adjustable measuring gauge is provided for increasing the accuracy of workpiece layout, power tool setup and workpiece marking jobs. The measuring gauge has mutually engagable positioning racks to positively lock both a reference surface and a measuring surface rigidly and accurately into place. The gauge includes first and second half section body members which are mounted in facing relationship, and first and second racks formed on their facing surfaces. Each of the first and second racks include index teeth which are equally spaced at predetermined intervals. The displacement of one body member relative to the other body member is adjustable in predetermined increments corresponding to the spaced intervals between successive teeth. The first flat end surface of each body member may be used to engage a reference surface of a workpiece or the work positioning surface of a power tool. The second flat end surface of each body member may be used for indexing the position of a marking tool on the location of a blade or bit relative to the first flat end surface of the opposing body member. The tool can be used for fence alignment, depth of cut, workpiece marking and as a center finder.

4 Claims, 5 Drawing Sheets

UNIVERSAL PRECISION MEASURING GAUGE

CROSS-REFERENCE TO RELATED APPLICATION:

This application is a continuation-in-part of Ser. No. 117,954, filed Nov. 9, 1987, now U.S. Pat. No. 4,793,604.

FIELD OF THE INVENTION

This invention relates generally to power tool accessory equipment, and in particular to a precision measuring gauge for increasing the accuracy of workpiece layout, power tool set-up and workpiece marking jobs.

BACKGROUND OF THE INVENTION

Operations in which wood or other material is shaped, drilled or cut by a power tool require the cutting edge of the tool and the workpiece to be precisely positioned relative to each other in order to achieve the desired results. For example, when a piece of wood is being cut by a table saw, the operator typically feeds the wood piece by hand through the saw blade along the axis of the desired cut to achieve as straight a cut as possible. This normally requires the aid of a "fence" or other alignment tool, which is oriented along the desired cut axis. The fence helps guide the wood piece through the saw blade when the fence is positioned at a desired spacing distance from the saw blade.

Other woodworking operations require marking of reference lines and scribe marks on a workpiece at a predetermined distance from a reference edge or reference mark. Other set-up operations require setting of the depth of cut of a cutting tool such as a saw blade or router bit relative to the support surface of a table or other workpiece support.

DESCRIPTION OF THE PRIOR ART

According to prior practice, a fence or other alignment tool is held in place by means of a clamping device. When it is desired to change the position of the wood relative to the cutting blade to make a different cut, the position of the fence or other alignment tool must be adjusted accordingly, usually with the aid of a ruler.

In other woodworking operations, such as setting depth of cut or marking a reference line, ruled scales, step gauges and adjustable squares are utilized. However, even the most expensive engraved rules and squares, no matter how precise, ultimately rely upon the inaccurate process of making a visual alignment on a hard-to-read graduation mark. Although such tools may have accurate index markings, there is no reliable way to transfer the tools' accuracy onto the workpiece, and the accuracy of the work is solely dependent upon the operator's skill and visual acuity. Consequently, measurements utilizing engraved rules and squares are not repeatable to the same degree of accuracy.

Another disadvantage of prior art positioning and alignment devices is that they are usually not accurate enough when precise positioning (i.e., within a few thousandths of an inch) is required. Another limitation of such prior art measuring devices is that cutting operations cannot be repeated at a prior measurement with acceptable accuracy because of the operator's inability to accurately repeat placement of the cutting tool after each operation.

OBJECTS OF THE INVENTION

It is, therefore, a general object of the present invention to provide an improved measuring gauge for increasing the accuracy of workpiece layout, power tool setup and workpiece marking jobs.

Another object of the invention is to provide an improved measuring gauge for precisely positioning the cutting edge of a power tool relative to a reference surface to an accuracy of within a few thousandths of an inch, or better.

Yet another object of the invention is to provide an improved measuring gauge for accurately marking reference lines or scribe marks onto a workpiece.

Still another object of the invention is to provide a measuring gauge for precisely positioning an alignment fence or other accessory relative to the cutting edge of a power tool.

A further object of the invention is to provide an improved measuring gauge which can be returned to any former measuring position with a reset accuracy of less than one thousandth of an inch.

Yet another object of the invention is to provide a measuring gauge for locating and marking the exact center of a workpiece such as a board or the like.

SUMMARY OF THE INVENTION

The foregoing objects are accomplished in accordance with the present invention by an adjustable measuring gauge having mutually engagable positioning racks to positively lock both a reference surface and a measuring surface rigidly and accurately into place. In the preferred embodiment, the gauge includes first and second body members having first and second relatively flat major surfaces disposed in facing relationship and first and second rack means disposed on the respective first and second major surfaces so that the first and second rack means are substantially in registration when the first and second major surfaces are engaged in facing relationship. Each of the first and second rack means has a plurality of index teeth equally spaced at predetermined intervals along the longitudinal axis thereof for being meshed together with the corresponding index teeth of the other rack means to prevent the body members from being moved relative to one another along the longitudinal axis. The gauge further includes fastener means for securing the first and second body members together along an axis which is substantially perpendicular with respect to the first and second major surfaces.

In one aspect of the invention, the position of the first body member relative to the second body member is adjustable along the longitudinal axis of the gauge in predetermined increments corresponding to spaced intervals between successive teeth of each rack means to adjust the effective length of the gauge. In one embodiment, each of the first and second rack means includes a pair of parallel elongated racks of substantially equal length.

According to another aspect of the invention, each of the first and second body members has a relatively flat end plate surface which is oriented substantially perpendicular with respect to the corresponding major surface of the body member for defining a reference surface when the gauge is used for marking a reference line or for positioning the cutting edge of a power tool relative to a reference surface. The respective flat end surfaces of the first and second body members are disposed at respective opposite ends of the gauge when the respective first and second major surfaces of the first and second body members are in facing relationship.

In one embodiment one of the flat end surfaces has a recessed index lip for accurately setting the distance from a fence reference surface to the inside edge of a cutting blade.

In another embodiment, one of the body members has a flat end surface with laterally spaced foot portions for supporting the gauge upright onto a flat workpiece surface while setting the depth of cut of a cutting tool such as a circular saw blade or a router bit which projects upright through a slot formed in the worktable.

According to another aspect of the invention, one of the flat end surfaces has an open window framed on opposite sides by indexing posts and a V-notch, for locating the center of an edge of a board up to a predetermined thickness.

In the preferred embodiment, each index tooth has an alignment edge which extends at a right angle along a transverse axis of the corresponding rack. The spaces between teeth in one rack receive the corresponding teeth of another rack when the racks are positioned in registration and the corresponding teeth thereof are meshed together.

The first and second body members have respective first and second elongated slots formed in the respective first and second major surfaces for receiving an elongated threaded bolt member therethrough. A threaded fastener is provided for engaging complementary threads of the bolt member at one end thereof to secure the first and second body members together. A distance measuring scale is disposed on at least one body member to allow a user to read the actual distance which the first body member has been moved relative to the second body member along the major axis of the gauge from a predetermined reference position at which the index teeth of first and second body members are engaged in interleaved registration.

BRIEF DESCRIPTION OF THE DRAWINGS

Further objects and advantages of the invention will be apparent from the detailed description and claims when read in conjunction with the accompanying drawings wherein:

FIG. 10 is an inverted, end elevation view of one-half section of the measuring gauge shown in FIG. 9; and, FIG. 11 is a top plan view, partially broken away, of the half section body member shown in FIG. 10.

DETAILED DESCRIPTION OF THE PREFERRED EMBODIMENT

In the description which follows like parts are marked throughout the specification and drawings, respectively. The drawings are not necessarily to scale and in some instances proportions have been exaggerated in order to more clearly depict certain features of the invention.

Figure 1:
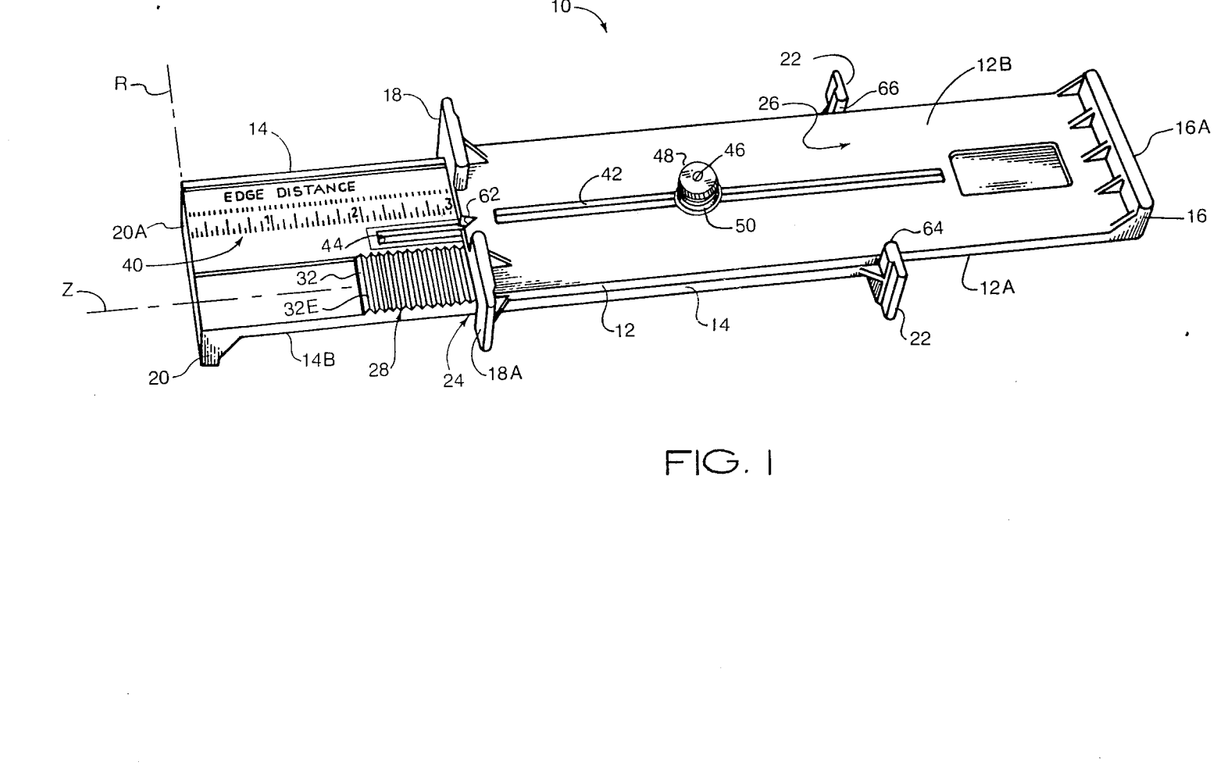
FIG. 1 is a perspective view of a measuring gauge constructed according to the present invention.
Figure 2:
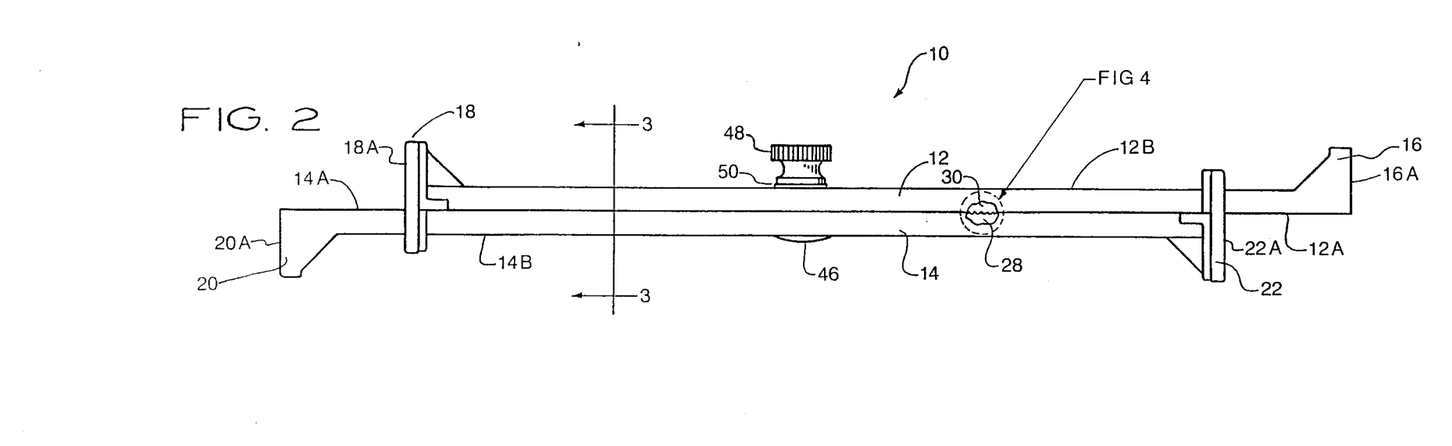
FIG. 2 is a side elevational view, with a portion thereof cut away, of the gauge shown in FIG. 1.

Referring to FIGS. 1-2, a measuring gauge 10 constructed according to the present invention includes respective first and second body member 12 and 14, which are disposed in overlapping surface-to-surface engagement (as shown in FIG. 1) so that respective major surfaces 12A, 14A of first and second body members 12, 14, respectively, are in facing relationship and respective second major surfaces 12B, 14B of first and second body members 12 and 14 are oppositely positioned. Preferably, the first and second body members 12, 14 are identical in all respects and form complementary half sections which are mutually engagable in interlocking engagement.

First and second body members 12 and 14 have relatively flat end plates 16, 18 and 20, 22, respectively. The end plates have flat surfaces 16A, 18A and 20A, 22A, respectively, for measurement and reference purposes, which are aligned substantially along transverse axis R in perpendicular relation with respect to the longitudinal axis Z. The end plates 18, 22 have window openings 24, 26, respectively, through which the end plates 16 and 20 are extendable as shown in FIGS. 1 and 2.

Figure 4:
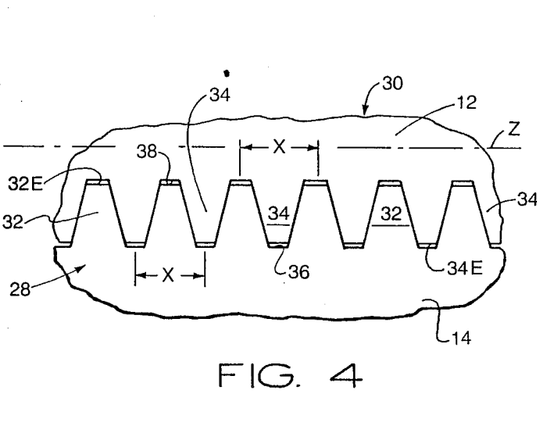
FIG. 4 is an enlarged fragmentary view showing meshed engagement of index teeth within the gauge for securing the upper and lower body members together.

The facing surfaces 12A, 14A of each body member have formed thereon toothed racks 28, 30, respectively. As best seen in FIG. 4, each rack 28, 30 includes a plurality of teeth 32, 34, respectively, spaced apart at predetermined equal intervals "X" along the longitudinal axis Z of the corresponding rack with pockets 36, 38 being defined between each adjacent pair of teeth within each rack, respectively. The teeth 32, 34 are interleaved or intermeshed with the corresponding teeth within the pockets 36, 38 of the facing rack, respectively, when respective first major surfaces 12A, 14A of first and second body members are disposed in facing engagement.

Figure 3:
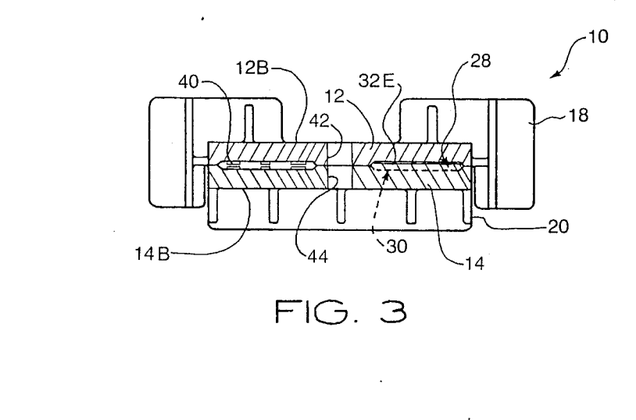
FIG. 3 is a sectional view of the gauge shown in FIG. 1, taken along the line 3—3 in FIG. 2.

Each tooth 32, 34 has an edge 32E, 34E, respectively, extending laterally across the corresponding rack in parallel with transverse axis R (as best seen in FIG. 1) for engaging the complementary pockets 36, 38, on the facing rack. Preferably, each tooth 32, 34 and each complementary pocket 36, 38 has a substantially frustoconical cross-section taken along the longitudinal axis Z of the corresponding rack to provide an approximate sawtooth pattern. When complementary racks 28, 30 are engaged as shown in FIGS. 2-4, first body member 12 is blocked against movement along the longitudinal axis Z relative to the second body member 14.

The interval "X" between successive teeth is determined by the measuring increment size desired for gauge 10. For example, spacing interval "X" may be on the order of 1/32 inch so that the position of first body member 12 relative to second body member 14 may be adjusted in increments of 1/32 inch. By this arrangement, the effective distance between the respective end plates may be adjusted accordingly in 1/32 increments by moving first body member 12 relative to second body member 14 along the longitudinal axis Z.

The position of first body member 12 relative to second body member 14 is adjusted by lifting first body member 12 from body member 14 to disengage the intermeshed teeth 32, 34 and moving first body member 12 in either direction along the longitudinal axis Z to the desired measuring displacement, whereupon the complementary racks 28, 30 are re-engaged to "lock" first and second body members 12 and 14 together along the longitudinal axis Z.

The racks 28, 30 are preferably integrally formed with the body members 12, 14, respectively. However, the racks 28, 30, may be removably attached to the corresponding body members by means of attachment screws as shown in my U.S. Pat. No. 4,793,604, which is hereby incorporated by reference.

A measuring scale 40 is provided for allowing the user to read the distance that first body member 12 has been moved relative to second body member 14 with reference to a predetermined "zero" position. The zero position may be referenced to surface 16A or 18A and 20A or 22A of body member 12 and 14, respectively, and is typically the position at which first body member 12 is substantially completely in registration with second body member 14, i.e., when the end plate surfaces 18A, 20A and 16A, 22A are in flush alignment (fully retracted). The length of scale 40 is typically equivalent to the maximum travel in either direction of first body member 12 relative to second body member 14 along the longitudinal axis Z. Scale 40 is preferably "double-numbered" or "bi-directional" so that it can be conveniently read by the operator with the "zero" position referenced to either surface 16A or 18A and 20A or 22A of body member 12 and 14, respectively.

First and second body members 12 and 14 include respective elongated slots 42, 44 which are at least partially in registration for providing a passage through gauge 10 along a vertical axis. A threaded carriage bolt 46 is inserted upwardly through the aligned slots 42, 44 from beneath second body member 14 so that the head of the bolt engages the external major surface 14B of second body member 14. A threaded fastener 48 engages the threaded end of the bolt 46 for tightening the bolt to secure first and second body members 12 and 14 together along both the vertical and horizontal axes when first body member 12 is at the desired measuring extension relative to second body member 14. A washer member 50 is interposed between fastener 48 and surface 12B surrounding slot 42 on first body member 12 to distribute clamping pressure, and to prevent damage to first body member 12 by torquing of handle 48.

Figure 5:
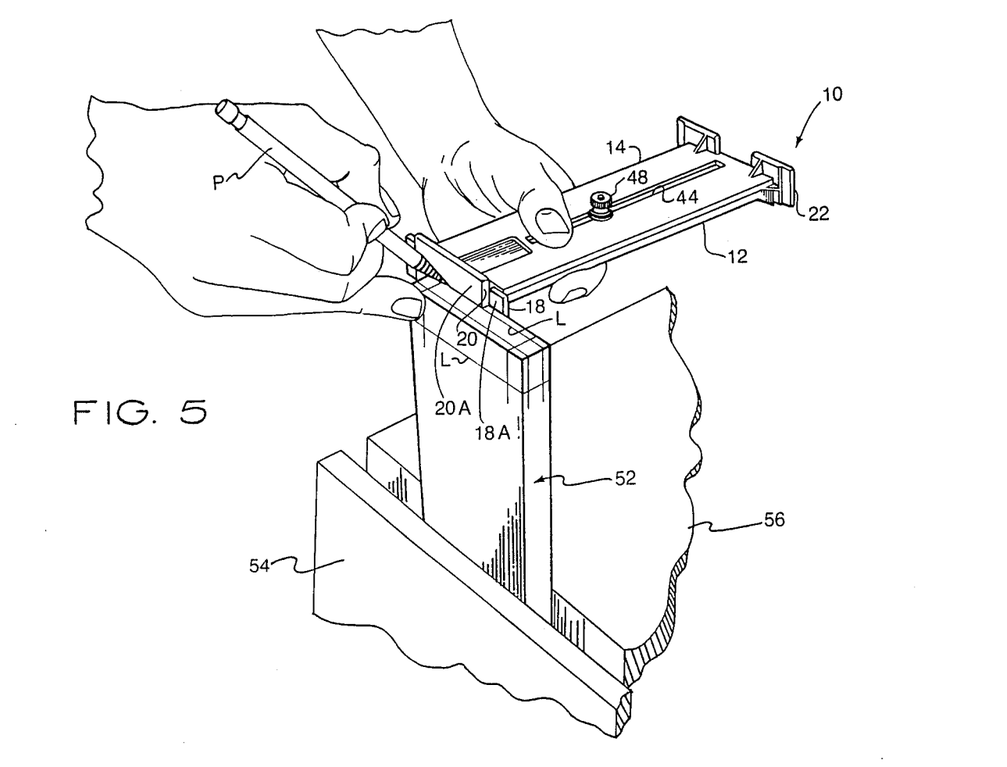
FIGS. 5 and 6 are perspective views illustrating use of the measuring gauge for marking reference lines on a workpiece at precise distances relative to a reference surface on the workpiece.
Figure 6:
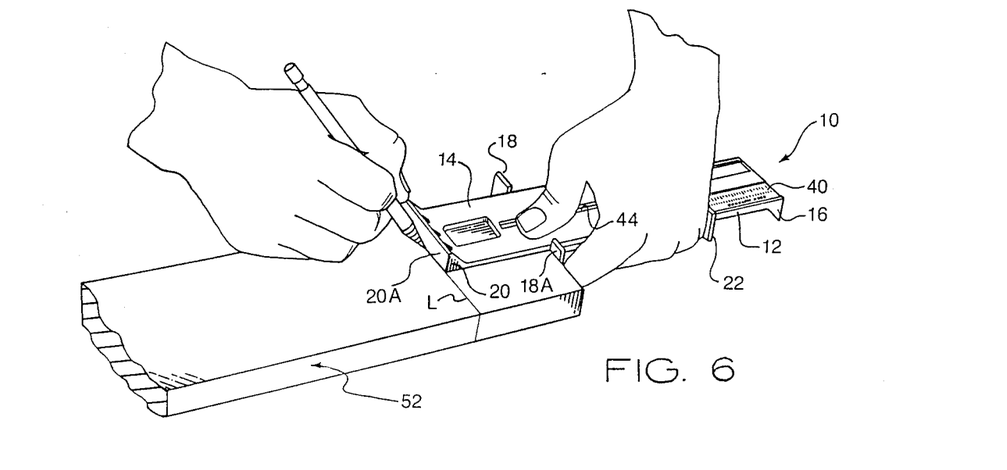

Referring now to FIGS. 5 and 6, the precision measuring gauge 10 is shown as used for marking reference lines L on a typical workpiece 52. In FIG. 5, the workpiece 52 is a board which may be of any desired dimensions. The workpiece 52 is clamped by a vice 54 in an upright orientation onto the edge of a worktable 56. As illustrated in FIG. 5, the precision measuring gauge 10 is being used for marking reference lines L onto the end of the board 52. After the fastener 48 has been released, the top half section body member 14 is extended through the window opening 24 while the operator observes the desired edge displacement measurement on scale 40. The top half section body member 14 is lifted so that the teeth 32, 34 become disengaged, and the top half body member is then extended relative to the bottom half section body member 12 until the desired edge measurement is indicated on the edge scale 40. The teeth 32, 34 are then fully engaged and the threaded fastener 48 is tightened, securely locking the body half sections together. Surfaces 20A and 16A are beveled along the marking edge to compensate for the thickness of the marking tool. The operator then marks the reference line L along surface 20A with a pencil P as indicated.

It is apparent, therefore, that the measuring gauge 10 can be used within its range for most marking applications for which a ruler or adjustable square would otherwise be used. Because of the identical construction of the two half section body members 12, 14, once the gauge 10 has been set, the line L can be drawn using either end of the gauge. Also, the scale on either top or bottom body member can be used for setting the position. Moreover, because of the tight interlocking engagement provided by the meshed teeth 32, 34, it is not necessary to re-tighten the fastener 48 for each new setting. Accordingly, a substantial time saving can be achieved by using the precision measuring gauge 10 for laying out a series of differently spaced marks.

Referring to FIG. 6, after the desired extension has been set, the reference face 18A is set into engagement along a reference surface of the workpiece. Thereafter, the reference face 20A is used as a guide for marking a reference line L. The measuring gauge 10 can be slipped along the reference surface of the workpiece 52 to mark a continuous line L onto a workpiece surface which exceeds the width of the marking surface 20A.

Figure 7:
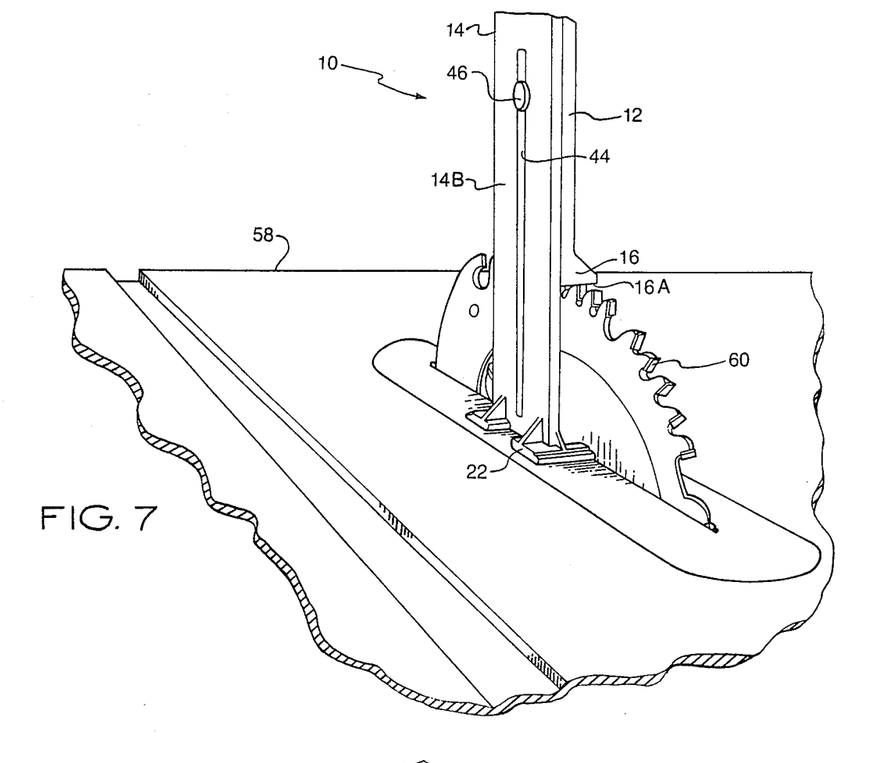
FIG. 7 is a perspective view illustrating use of the measuring gauge for establishing the depth of cut of a circular cutting blade relative to a workpiece support surface.
Figures 10, 11:
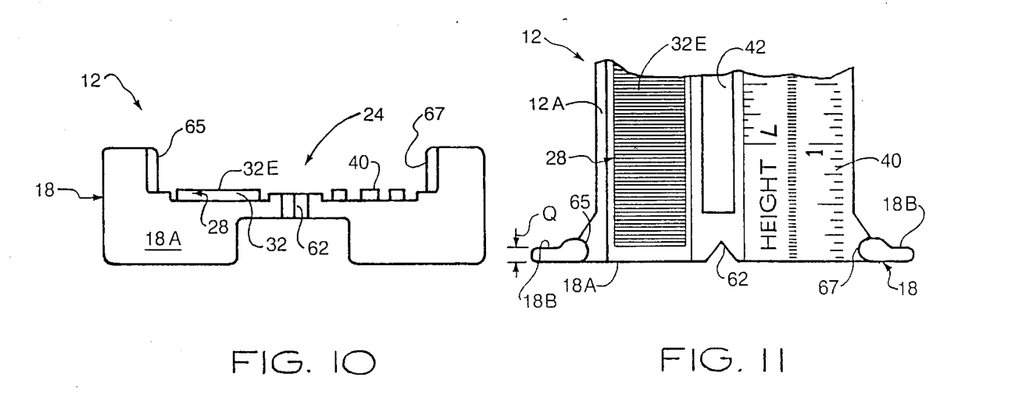

Referring now to FIG. 7, the precision measuring gauge 10 is shown set up onto the worktable of a power saw 58 adjacent a circular saw blade 60. In this arrangement, the measuring gauge 10 is freestanding in an upright, perpendicular orientation with the end plate 22 resting onto the table surface. The depth of cut adjustment is acomplished by setting the top-most part of circular blade 60 against indexing lip 16A. First, the top half section body member 12 is extended to the desired depth of cut as indicated by the end of the scale 40 on the bottom half section 14 that reads "Height" (FIG. 11). Then, the saw cutting height is adjusted until the saw blade touches the indexing lip 16A.

As with other modes of operation, either end of the gauge 10 can be used for making the depth of cut setup, and the scale on either top or bottom body member can be used for reading the position. Since the gauge 10 is freestanding completely on its own, the operator may use both of his hands to adjust the cutting height of the circular saw blade 60. The measuring gauge 10 can be used in the identical manner for establishing the depth of cut of a router bit.

Figure 8:
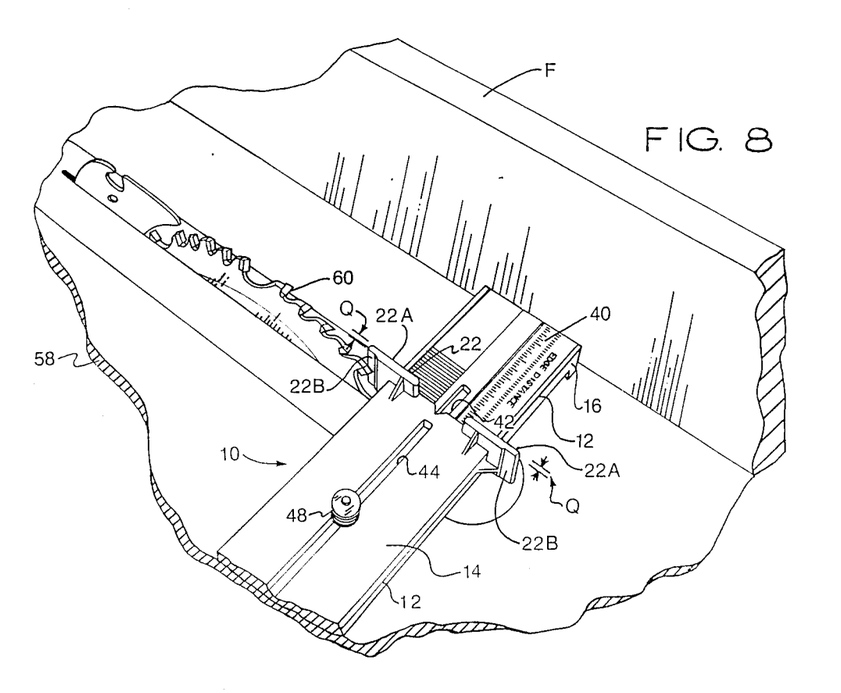
FIG. 8 is a perspective view illustrating use of the measuring gauge for accurately setting the distance of a table fence relative to the inside edge of a circular saw cutting blade.

Referring now to FIG. 8, the measuring gauge 10 is used to precisely set the position of a fence F relative to the inside cutting edge of a circular saw blade 60. This arrangement works equally well for setting the cutter-to-fence distance on a router table, band saw or drill press. To set the distance to the inside cutting edge of the blade 60, the precision measuring gauge 10 utilizes an indexing lip 22 which has a known thickness dimension Q as measured between reference surfaces 22A, 22B. Q is some integral multiple of rack tooth spacing distance "X" (FIG. 4). For example, for $X = 1/32$ inch, $Q = \frac{1}{8}$ inch. According to this arrangement, the gauge 10 should be set to a reading which is less than the desired blade-to-fence distance by the lip thickness Q. The preferred way to do this is to first set the gauge to the actual distance desired, and then retract it by an amount equal to the lip thickness Q.

For example, if the desired fence-to-cutting edge distance is 3½ inches, and assuming an index lip thickness Q of ⅛ inch, the half section body member 12 is first extended to 3½ inches and then is backed off by ⅛ inch, yielding a gauge setting of 3⅜ inches. The ⅛ inch which is backed off is compensated by the thickness Q of the indexing lip 22, thereby yielding an effective fence-to-cutting edge gauge setting of 3½ inches.

The fence F is used to maintain a workpiece in a desired position during a cutting operation. That is, a workpiece, such as the board 52 is fed through the saw blade 60, with one edge of the board being guided along the fence F as the board is advanced through the cutting edge of the circular saw blade 60. After the cutting operation is complete, additional cuts in the board 52 can be made by resetting the position of the fence F relative to the inside edge of the circular saw blade 60, by adjusting the extension of the precision measuring gauge 10 as previously described.

Figure 9:
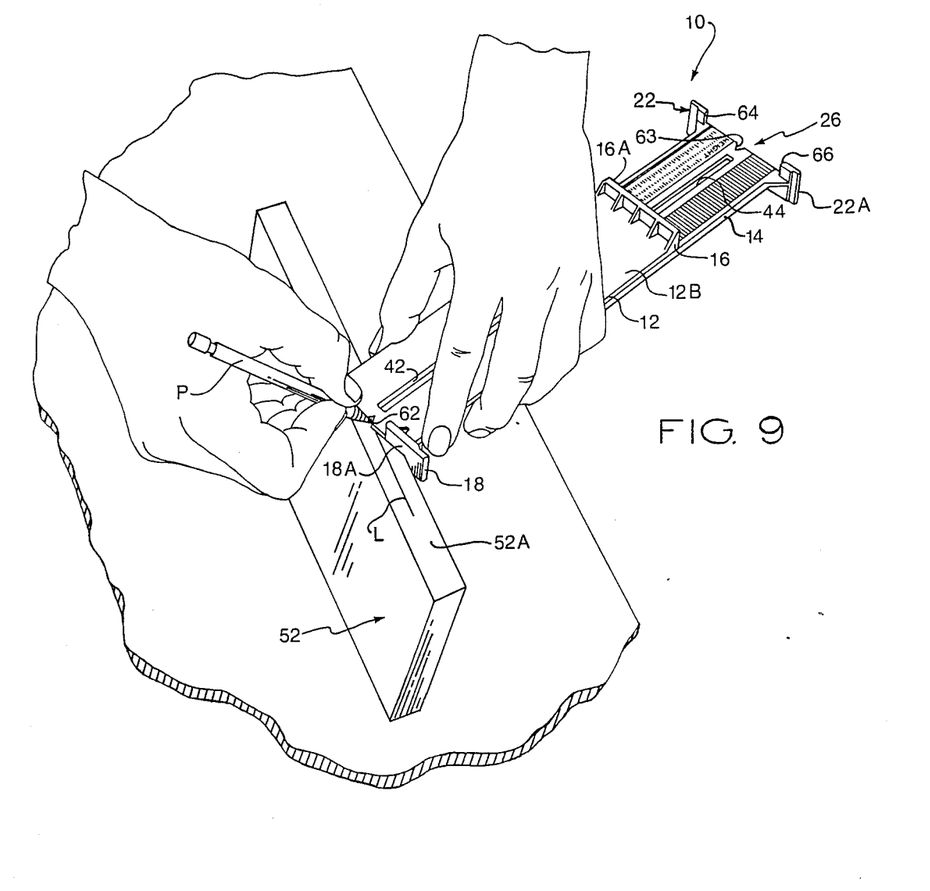
FIG. 9 is a perspective view which illustrates use of the measuring gauge for locating and marking the center of a board side surface.

Referring now to FIGS. 9, 10 and 11, the measuring gauge 10 is being used as a center finder to accurately mark the center of one side edge of a board 52. To perform this job, the lower half section body member 14 is retracted out of the window opening 24 as shown in FIG. 9. The end plate 18 is then fitted transversely over the side edge 52A, with the reference surface 18A projecting substantially at a right angle to the board side edge surface 52A. The center is precisely established by a V-notch 62 which intersects the body member 12 through the reference surface 18A, as can best be seen in FIGS. 10 and 11.

On the opposite end of the gauge 10, the lower half body section 14 has a V-notch 63 which intersects the body member 14 through the reference surface 22A. The window opening 26 is framed on either side by semi-cylindrical index posts 64, 66. The window opening 24 formed on the opposite end of upper half section body member 12 is also framed on either side by a pair of semi-cylindrical index posts 65, 67, as shown in FIGS. 10 and 11.

To find the exact center of the side edge 52A, the gauge 10 is fitted onto the board 52, with the side surface 52A being inserted into the window opening 24. The gauge is then rotated to bring the index posts 65, 67 into engagement with the opposite major side surfaces of the board 52. The vertex of the V-notch 62 is located substantially at the center between the two indexing posts 65, 67, and is slightly oversized to allow for the thickness of a sharp pencil or scribe. According to this arrangement, the sharp point of a pencil P when held within the V-notch 62 will mark the center of the side edge surface 52A of the board. A centerline L lying along the center of the side edge 52 can be traced by holding the pencil point within the V-notch 62 while sliding the gauge 10 along the length of the board 52.

It will be appreciated that the universal precision measuring gauge 10 is a versatile, effective tool which will greatly increase the accuracy of layout, setup and marking jobs. While doing so, it will substantially reduce the time and effort required to accomplish such tasks. Because of its universal design, the gauge 10 serves as a precision marking gauge, a freestanding depth of cut gauge, a fence alignment gauge, and a center finder. Because the gauge 10 is precision cast, it can perform all of these functions with an accuracy typically better than 1/250 of an inch (about the thickness of a piece of paper stationery). Overall accuracy is limited only by the processes and materials used to manufacture the gauge 10. Moreover, the gauge 10 can be returned to any former measurement with a repeatability error that is much less than one thousandth of an inch.

Most importantly, the precision measuring gauge 10 is capable of transferring all accuracy directly into the operations with no uncertainty. This is accomplished by overcoming a common problem associated with other layout and measuring tools. Even the most expensive engraved rules and adjustable squares, no matter how precise, ultimately rely on the inaccurate method of making a visual alignment on a hard-to-read graduation mark. That is, although such engraved tools may be very accurate, their accuracy is lost because of the skill required by the operator in making the visual comparison and alignment. This problem is avoided by the measuring gauge 10 which uses precision sawtoothed position racks to positively lock both a reference surface and a measuring surface rigidly and accurately together, thereby securing a desired displacement of the body members. The reference surface engages against the surface to be measured from, while the measuring surface positively locates the point to be measured to. Accordingly, all of the uncertainty and visual acuity problems common with other layout tools are completely eliminated.

It will be appreciated that the gauge extension can be quickly and accurately adjusted by loosening fastener 48 and moving first body member 12 relative to second body member 14 along the longitudinal axis Z. The relative displacement can be adjusted in increments as small as the width of each spacing "X" between successive teeth 32 and 34 for precise positioning within a few thousandths of an inch or better. First and second body members 12 and 14 and the racks 28 and 30 are preferably formed of a readily moldable material, such as a tough polymer material with substantial resistance to impact and shearing forces. The gauge 10 allows a user to precisely set the position of a workpiece relative to a cutting tool, such as a saw blade or a router bit. The relative ease and accuracy with which the extended position of the gauge can be readjusted enhances the speed and accuracy of the marking and setup operations.

A preferred embodiment of the invention has been described in detail. Since it is obvious that changes in and additions to the above-described preferred embodiment may be made without departing from the nature, spirit and scope of the invention, the invention is not to be limited to the preferred embodiment, except as set forth in the appended claims.

What is claimed is:

1. A measuring gauge for positioning the working surface of a tool relative to a reference surface disposed on apparatus for supporting a workpiece, said measuring gauge comprising, in combination:

first and second body members having first and second major surfaces disposed in facing relationship, each body member having a longitudinal axis;

first and second rack means disposed on said first and second major surfaces, respectively, each of said first and second rack means having a plurality of teeth spaced at predetermined intervals along a longitudinal axis of the corresponding rack means, said teeth of said first and second rack means being releasably disposed in mesh engagement;

fastener means for releasably measuring said body members together; and, each of said body members including first and second end plates disposed on respective opposite ends of each body member, each end plate having an end surface which projects transversely with respect to the longitudinal axis of the corresponding body member, one of said end plates on each body member having a window opening through which the other body member can be extended and retracted.

2. A measuring gauge as defined in claim 1, the end plate of each body member having a first relatively flat reference surface which is oriented substantially perpendicular with respect to the longitudinal axis of the corresponding body member, one of said end plates being a window end plate having an open window through which the other body member can be extended and retracted, said window end plate having a second reference surface formed on the opposite side of said window end plate, wherein the thickness of the window end plate between the first and second reference surfaces is a predetermined distance equal to an integral multiple of the rack tooth spacing interval.

3. A gauge for guiding a marking tool along a line in parallel with a reference surface formed on a workpiece comprising, in combination:

first and second body members having first and second major surfaces disposed in facing relationship and each body member having a longitudinal axis;

first and second rack means disposed on said first and second major surfaces, respectively, each of said first and second rack means having a plurality of teeth spaced at predetermined intervals along a longitudinal axis of the corresponding rack means;

each of said body members including an end plate having a relatively flat end surface which is oriented substantially perpendicular with respect to the longitudinal axis of the corresponding body member, one of said end plates having a window opening through which the other body member is extendable and retractable; and, fastener means for releasably securing said body members together.

4. A tool for positioning a workpiece onto the support surface of a worktable at a measured distance relative to a reference surface comprising, in combination:

first and second body members having first and second major surfaces disposed in facing relationship, each body member having a longitudinal axis;

first and second rack means disposed on said first and second major surfaces, respectively, each of said first and second rack means having a plurality of teeth spaced at predetermined intervals along the longitudinal axis of the corresponding rack means;

each of said body members including an end plate having a relatively flat end surface which is oriented substantially perpendicular with respect to the longitudinal axis of the corresponding body member, one of said end plates on one of said body members having an open window through which the other body member can be extended and retracted; and, fastener means for releasably securing said body members together.

* * * * *